Patented Nov. 17, 1931

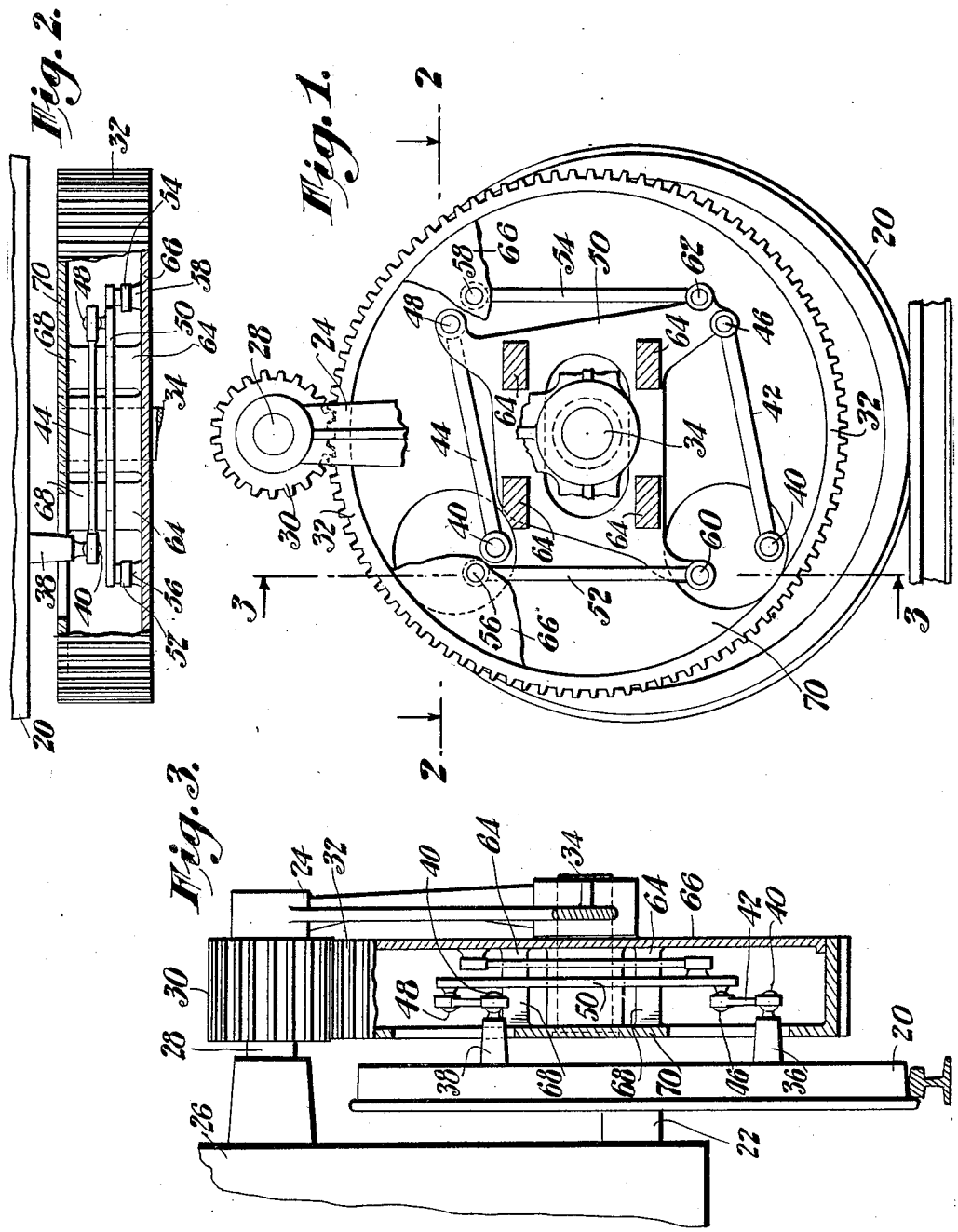

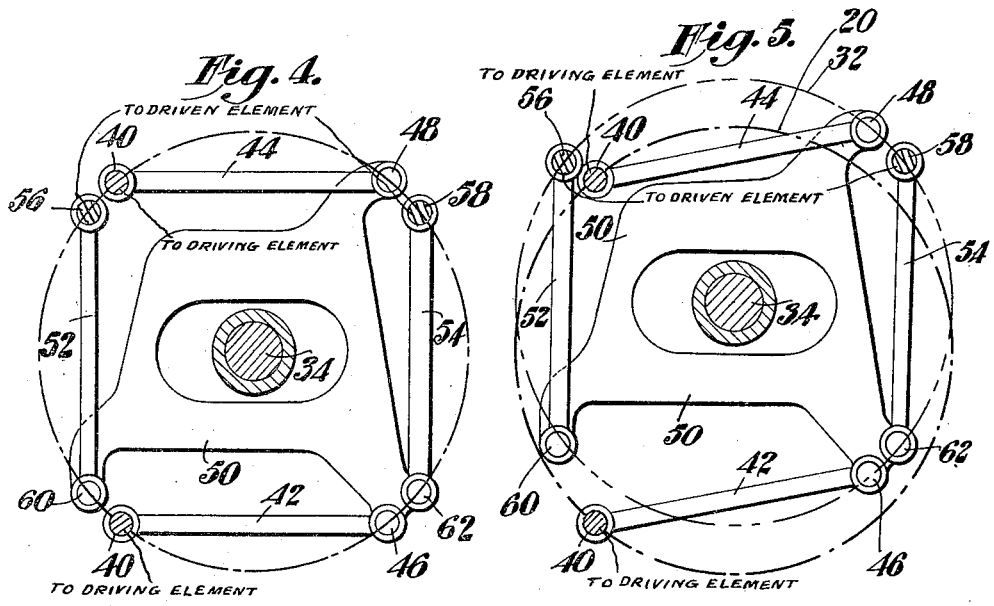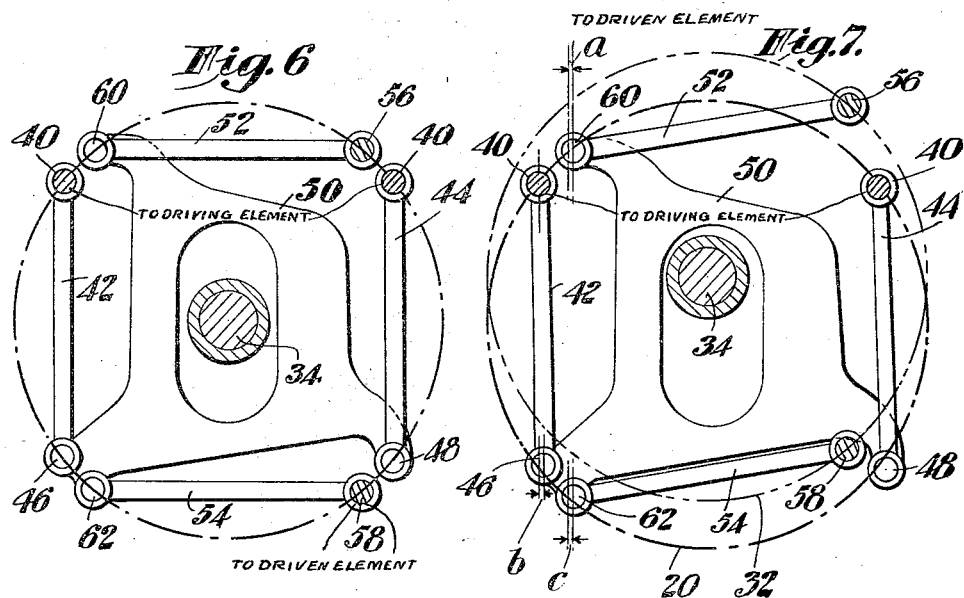

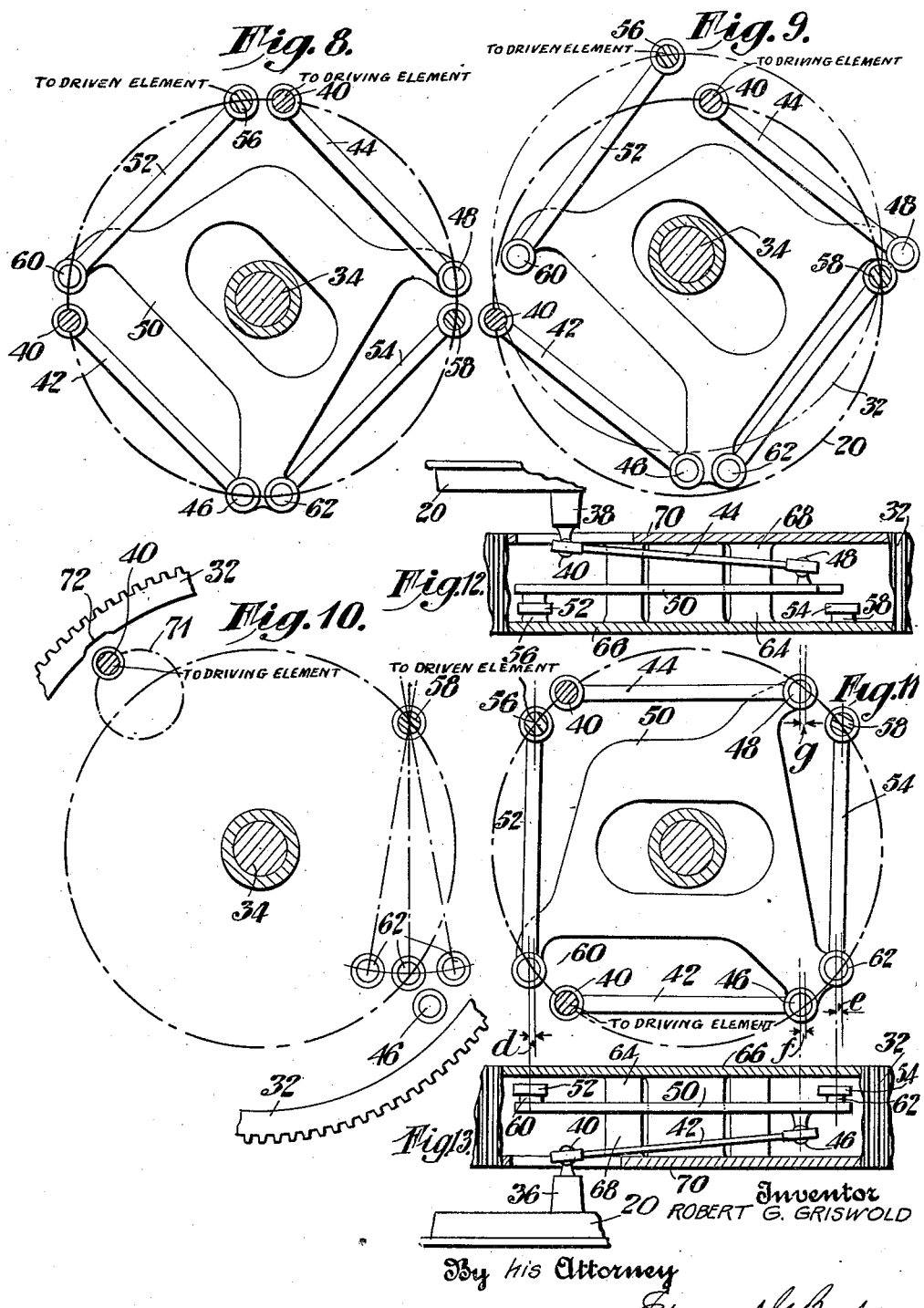

1,832,300

UNITED STATES PATENT OFFICE

ROBERT G. GRISWOLD, OF WESTFIELD, NEW JERSEY, ASSIGNOR TO DOHERTY RESEARCH COMPANY, OF NEW YORK, N. Y., A CORPORATION OF DELAWARE

HEAVY DUTY FLEXIBLE POWER TRANSMISSION

Application filed December 3, 1927, Serial No. 237,369. Renewed April 14, 1931.

The present invention relates to flexible couplings or other transmitting mechanisms and more particularly to a design of power transmission adapted for use in a transmission between a high speed motor and a driven wheel.

Flexible couplings are desirable in a variety of situations, but the electric locomotive is an instance in which the flexible coupling or transmission is frequently the limiting factor of the design. It has been found essential to mount the motor on a spring supported frame in order that the track structure may be protected from the pounding action of large unsprung weights. It is necessary however that the torque of the motor be transmitted to drivers resting directly on the rails. A power or torque-transmitting mechanism is therefore necessary between the motor and the drivers capable of adjusting itself to relative vertical or lateral movements between the motor and the driver at the same time that the torque is being transmitted between the two. The ordinary side rod coupling which has been so successful in steam locomotives has not proven satisfactory in electric locomotives. One of the reasons for the dissatisfaction with the side rod drive in electric locomotives is that the electric motors are very heavy per unit volume and the side rod coupling or drive is particularly adapted to an arrangement having one or two motors per locomotive. However, experience has demonstrated that electric operation of railways is not economic unless the locomotives have a very high horse power rating. If the power is concentrated on the locomotive in one or two electric motors the mechanical design of the locomotive frame becomes difficult. It has been recognized that it is desirable to obtain a flexible coupling or power transmission readily adaptable to an arrangement having a single motor for each locomotive driver. Various couplings or drives have been proposed and tested for this purpose, but it has proven difficult to find an arrangement having the requisite simplicity and ruggedness for railroad practice and which has also the inherent capacity to accommodate itself to, or compensate for, quick changes in eccentricity between the driving and driven elements or for quick lateral movements between the two such as are ordinarily caused in railroad practice by movements of the springs or by end-play of the locomotive axles.

The clause "capacity to accommodate itself to, or compensate for quick changes in eccentricity . . . or for quick lateral movement" as used above is intended to include the capacity to transfer motion from the driving to the driven member without variation of angular relation due to the relative vertical or lateral motions of the driving and driven members.

It is one of the objects of the present invention to provide a simple and durable coupling mechanism capable of transmitting torque between two driving members with minimum variation of angular relation due to changes of eccentricity between the driving and driven members.

The second object of the present invention is to provide a simple and durable coupling mechanism capable of transmitting torque between two rotating members without variation of angular relation due to end play movements between the driving and driven members.

A third object is to provide a uniform angular ratio mechanism that will so function when the centers of rotation do not normally or ever coincide.

In the construction of the transmission gearing for electric locomotives a further difficulty has arisen in connection with gearing of the type that overlie the locomotive drive wheel due to the fact that the limited clearance permitted the locomotive beyond the rail does not allow for a sufficiently wide gear to permit the use of gear teeth of sufficient length. A relatively short gear and the mechanism connecting the same to the drive wheel together with the supporting structure, take up all the allowable clearance space.

It is a further object of this invention to provide a construction permitting the use of a relatively wide gear. To this end it is a feature of this invention to construct the gear in the form of a wide hollow disk which may be disposed closely adjacent the drive wheel of the engine, the interconnecting mechanism being disposed within the hollow gear wheel so that the same does not take up any of the space between the drive wheel and the gear wheel. This construction also protects the transmission mechanism from dust and dirt since the hollow gear wheel forms a substantially closed casing therefor.

A further difficulty arises in connection with the transmission of electric locomotives of this type in that it is usually desired to have as great a reduction in gearing between the motor and the drive wheel of the locomotive as possible in order that small high speed motors may be utilized. To this end the pinion on the motor shaft is usually made as small as possible and the gear wheel lying adjacent the drive wheel of the locomotive is made as large as practicable. The limit to the reduction which is obtainable in the usual construction is soon reached however, due to the fact that the gear wheel must be of less diameter than the drive wheel in order to provide a sufficient clearance between the gear wheel and the track or road bed.

Since the shaft of the motor must lie sufficiently far above the drive wheel to permit relative motion therebetween, the pinion on the motor shaft must always be of such diameter as to span this clearance and extend down to the overlying gear wheel.

It is a further object of this invention to provide a construction in which a great reduction between the pinion on the motor shaft of the gear wheel adjacent the drive wheel of the locomotive is obtainable without the use of intermediate idle gears. To this end it is a further feature of this invention to provide a construction in which the axis of the driving gear is normally above the axis of the drive wheel of the locomotive, whereby a larger clearance is obtained between this gear and the track bed, and a much greater reduction is obtained between the motor shaft and the drive wheel of the locomotive.

The novel features of the present invention are pointed out with particularity in the appended claims. The invention, itself, however, together with further objects and advantages, will best be understood from the following description taken in connection with the accompanying drawings in which:—

Fig. 1 is an elevational view of the locomotive driver mounted on the rail and a driving gear mounted on the spring-supported frame of the locomotive, the gear and wheel being coupled by a power transmission according to the present invention. It will be understood that parts of Fig. 1 are broken away and parts are being shown in section, for purposes of illustration;

Fig. 2 is a sectional view taken on the line 2—2 of Fig. 1 looking in the direction of the arrows;

Fig. 3 is a sectional view taken on the line 3—3 of Fig. 1 and looking in the direction of the arrows;

Fig. 4 is an elevational view, somewhat diagrammatic in character illustrating the parts of the transmission mechanism in a certain angular position and when the driving and driven elements are concentric;

Fig. 5 is an elevational view illustrating the parts of the transmission mechanism in the same angular position as in Fig. 4 but when the driving member has been shifted vertically with respect to the driven member;

Fig. 6 is a view similar to Fig. 4 with the exception that the parts have been rotated 90°;

Fig. 7 is a view similar to Fig. 6 but in which the driving member has been shifted vertically with respect to the driven member;

Fig. 8 is an elevational view of the parts of the transmission mechanism according to the present invention, the parts being illustrated in an angular position intermediate those of Figs. 4 and 6;

Fig. 9 is a view similar to Fig. 8 but in which the driving member has been shifted vertically with respect to the driven member;

Fig. 10 is a diagrammatic view illustrating the paths of certain points in the mechanism according to the present invention when the axis of the driven member is shifted around the circumference of a circle whose radius is the maximum eccentricity permitted by the mechanical clearances.

Fig. 11 is a view similar to Fig. 4 but illustrating the changes in positions of the parts caused by end-play;

Fig. 12 is a view illustrating the appearance of the parts of the mechanism when shifted by end-play and as seen from above, the parts of the apparatus being in the same position as in Fig. 11;

Fig. 13 is a view of the parts as in Figs. 11 and 12 as seen from below.

Referring to the drawings more in detail, 20 is the driver of a locomotive, said driver having an axle 22. 24 indicates a portion of the truck frame said frame being supported from one or more axles such as 22 by suitable spring supports not shown. Mounted upon the spring-supported frame is the frame 26 of an electric motor, said motor having armature shaft 28, the outer end of which is journalled in the frame 24. Shaft 28 carries a pinion 30. In the arrangement illustrated, the pinion 30 meshes with the hollow gear 32. The gear 32 is mounted to revolve on the pin 34 carried by the frame 24. The gear 32 carries within it the power transmitting mechanism according to the present invention. In order to facilitate the transmission of power between gear 32 and wheel 20, the wheel 20 is provided in the arrangement illustrated with two outwardly projecting pins 36 and 38. Pins 36 and 38 project through openings in the inner face 70 of gear 32 and at their outer ends are provided preferably with balls 40, 40 forming portions of ball and socket joints. Two links 42 and 44 have each one end pivotally mounted on one of the balls 40. The other ends of the links 42 and 44 are connected by ball and socket joints 46 and 48 to an intermediate floating member 50. In the arrangement illustrated, the ball and socket joints 46 and 48 project laterally from the side of the intermediate member 50 so that the links 42 and 44 may normally lie in a plane parallel to the member 50. Moreover, the distance between the balls on the driving wheel is equal to that between the ball and socket joints 46 and 48 on the member 50 so that the links 42 and 44 are parallel. It will be seen therefore that, if the member 50 is rotated, the links 42 and 44 transmit a couple to the driver 20 tending to rotate the latter member. Power for rotating the member 50 and therefore the driver 20 is supplied from the motor having frame 26 through the pinion 30 and gear 32. The connection between the gear 32 and the member 50 comprises a second pair of links, namely links 52 and 54. Links 52 and 54 are pivoted at their one ends to the inside of the outer plate 66 of gear 32 at the points 56 and 58 respectively. The other ends of links 52 and 54 are pivoted to the member 50 at the points 60 and 62, respectively. The points of connection 60 and 62 of links 52 and 54 to the member 50 are preferably the same distance apart as the points 56 and 58 at which links 52 and 54 are connected to gear 32 so that the links 52 and 54 are parallel. It is preferred moreover, that the links of each pair be not only parallel but of equal length, for instance 42 being preferably equal in length to link 44, and link 52 being equal in length to link 54. It will be seen therefore that the rotation of the gear 32 transmits a couple of forces to rotate the member 50. Also the rotation of member 50 transmits a couple to rotate the wheel 20.

While, as hereinafter appears, the links 42 and 44 do not always remain parallel to the plane of rotation of the gear 32, it is preferred that the plane of rotation of the intermediate member 50 be always parallel to that of the gear 32. For this purpose, gibs 64, 64 are fixed to the inner face of the front plate 66 of gear 32 and project close to the face of the member 50. Similar gibs 68, 68 are fixed to the inner face of the rear plate 70 of the gear 32 and project close to the face of the member 50, the gibs 64 and 68 thereby constraining the member 50 to revolve in a plane substantially parallel to the plane of rotation of gear 32. It will be seen that the intermediate member 50 floats, as it were, having no fixed center of rotation with respect to the frame 24 and its weight being entirely and freely supported by the links 42, 44, 52 and 54 from the driving member 32 and driven member 20. It will be seen furthermore that the pair of links 42 and 44 necessarily make a material angle with the links 52 and 54. If the direction of links 42 and 44 coincides with that of links 52 and 54, in other words unless the angle between these two directions lies between zero and 180°, there is no freedom of motion of the gear 32 relative to the wheel 20 except in a direction perpendicular to the said links. In the arrangement illustrated, it will be noted that when link 52 is in tension, the link 54 of the pair connecting the gear to the intermediate member 50 is in compression. Similarly when link 42 between the driver and member 50 is in compression, the corresponding link 44 of the pair is in tension. Preferably the line 40—40 is at right angles to line 56—58. A related feature is that links 42 and 44 alternate with links 52 and 54 when the apparatus is viewed parallel to the axes of rotation as in Fig. 1. This is the preferred arrangement, but the invention is not limited thereto. It is preferred also that the axes of rotation of both the driving and driven members lie between the center lines of both pairs of links throughout a revolution. It will be obvious from the foregoing that the flexible power transmission or coupling according to the present invention is well adapted to transmit power from the driving to the driven member under uniform conditions. In Figs. 4–13 inclusive I have illustrated the action of the mechanism according to the present invention in transmitting torque under the varying conditions apt to be encountered in locomotive practice. Figs. 4–9 illustrate more particularly the capacity of the mechanism according to the present invention to accommodate itself to or to compensate for movements of the spring supported frame with respect to the axle or axles of the drivers. In this connection it will be understood that a movement of the springs or of the spring-supported frame changes the relative position of the axis of rotation of the driving member with respect to that of the driven member. In other words it changes the position of the axis of rotation of the gear 32 with respect to that of the wheel 20. Unless the coupling intermediate the driving and driven members possesses certain inherent characteristics, the parts of the coupling or power driven transmission mechanism must either stretch or slip the wheels, in either case varying the relative angular relation between the driving and driven members during a given revolution and throwing severe stresses on the parts. Such conditions are highly prejudicial to the locomotive, producing a high rate of wear and leading to accidents. A given mechanism can be tested as to its capacity for accommodating itself to or compensating for changes in eccentricity by determining graphically if such changes in eccentricity will tend to produce a stretching or contraction of the parts of the mechanism. It is a notable fact, moreover, that certain mechanisms which have been used for transmitting torque between a gear and a driver wheel in a locomotive are capable of accommodating themselves to, or compensating for, the changes in eccentricity when in one position, but are incapable of accommodating or compensating when they have rotated to another position. Accordingly I have illustrated graphically in Figs. 4-9 inclusive the action of the apparatus according to the present invention when subjected to changes in eccentricity in three different angular positions. In Fig. 4, the pair of links 52 and 54 are vertical as in Fig. 1. In Fig. 6 the pair of links 42 and 44 are vertical, the links 52 and 54 being horizontal. In Fig. 8, the angular position is midway between that of Fig. 4 and Fig. 6. In Fig. 4, the axis of rotation of the driving and driven members, such as gear 32 and wheel 20 are assumed to coincide. Assume now that the axis of the driving member is suddenly raised with respect to that of the driven member as might be caused by action of the locomotive springs. The points 56 and 58 being thereby raised from their positions as illustrated in Fig. 4, member 50 is lifted, the points 40 however remaining at the same level as before. The points 46 and 48 being connected to the fixed points 40 by the links 42 and 44 tend to describe arcs about the points 40. The member 50 not being held against movement in that direction is however free to swing so as to permit the points 46 and 48 to move as required by the links 42 and 44. This lateral movement of the intermediate member 50 involves merely a slight swing of the links 52 and 54 to the left of the position occupied in Fig. 4. The parts can therefore accommodate themselves to the new position as illustrated in Fig. 5 without any stretching or change of length of any individual part. The change in eccentricity therefore from the position shown in Fig. 4 to that shown in Fig. 5 can be accomplished by the present mechanism without any variation in the angular relationship transmitted between the driving and driven members.

Considering now Figs. 6 and 7, when the axis of gear 32 is shifted vertically with respect to that of wheel 20, the points 56 and 58 move in a vertical line, the points 40, 40 being in a fixed horizontal line. In this instance, the change in eccentricity will be found to involve merely a slight swing of the intermediate member 50 to the right in order that the parts of the apparatus may accommodate themselves to the new condition of affairs without lengthening or shortening any of the parts or the distances between any two of the pivotal points. In Fig. 7, the movement of the pivot 60 when the eccentricity shifts from zero to that in Fig. 7 is indicated at $a$. The shift of the point 46 under the same conditions is indicated on Fig. 7 at $b$, the shift of the point 62 under the same conditions is indicated on Fig. 7 at $c$, and the shift of the point 48 under the same conditions is indicated at $e$. The distances $a$, $b$, $c$ and $e$ are all equal. It is evident that the movement of the part 50 needed to accommodate or compensate for a considerable shift in eccentricity is very slight.

Similarly it will be found that when the parts are in the position illustrated in Fig. 8, the axis of the driving and driven member may be shifted with relation to each other without tending to stretch any of the parts, the action of the parts in this instance being illustrated in Fig. 9. No stretching of any of the parts occurs in passing from the position of Fig. 8 to that of Fig. 9. It will be seen from the foregoing that, so long as the planes of rotation of the driving, intermediate and driven members all remain parallel, the compensations for eccentricity and end play are mathematically exact.

In Fig. 10, I have illustrated diagrammatically the locus 71 of one of the pivot points such as 40 on the driven member 20 when the axis of the driving member is shifted around the axis of the driven member along the circumference of a circle whose radius is that of the maximum degree of eccentricity permitted by the assumed position of the pivots and the interior diameter of the gear 32. It will be evident, that the pivot points 40 must not strike the inner face of the gear wheel 32, although the rim of the gear wheel may be cut out as indicated at 72 to permit a higher degree of eccentricity between the axis of driving and driven members than would otherwise be possible. If the rim of the wheel 32 is cut out, however, it should be reinforced in some way to prevent breakage at the point it is cut away. In the arrangement illustrated the shorter the links 42 and 44 the greater the possible eccentricity between axes of rotation of members 32 and 20 before pins 40 strike the inner face of the gear flange. Shortening the links, however, increases the unit stress in them during rotation. On Fig. 10, I have illustrated also the locus of the positions of one of the pivot points, such as 62, when the axis of the driving member is shifted around the other axis at the maximum radius permitted by the assumed design. The point 62 is one of the pivot points on the intermediate member 50 of the links connecting the intermediate member with the driving member.

In Figs. 11, 12, and 13 I have illustrated the action of the parts of the mechanism according to the present invention in accommodating themselves to end-play movements between the wheel 20 and the gear 32. It will be evident from Figs. 12 and 13 that a considerable end-play is permitted by the ball and socket joints at the points 40, 40, 46 and 48 without causing interference between the links 42 and 44 and the inner side plate 70 of the gear 32 or causing a stretching of any of the parts. Moreover, in Fig. 11 I have illustrated at $d$, $e$, $f$ and $g$ the respective movements of the pivots on members 50, 60, 62, 46 and 48, as caused by an amount of end-play illustrated in Figs. 12 and 13. It will be seen that the mechanism according to the present invention accommodates or compensates for a very considerable amount of end-play without tending to change the length of any of the parts and thereby causing a variation of angular relation during rotation of the driving and driven members. It will be seen therefore that the apparatus according to the present invention is capable of compensating for both vertical or eccentric movements and end-play movements between the driving and driven member. Moreover, it has been found that the two different classes of movements may occur simultaneously without interfering with the smooth action of the present apparatus.

It will be seen from Figs. 4, 6 and 8 that the preferred proportions of apparatus according to the present invention are such that, when the axis of the driving member coincides with that of the driven member, one pair of links 52 and 54 is approximately at right angles to the other pair of links such as 42 and 44. It is preferred also that the pair of links 42 and 44 connected to the wheel 20 be equal in length to the links 52 and 54 connected to the gear 32. Moreover, members of one pair of links preferably alternate with those of the other pair in passing around the axes of rotation or when viewing the parts as Fig. 1 parallel to the axes of rotation.

It has been found that, in emergencies, the apparatus according to the present invention will transmit a considerable amount of torque when one of the links connected to the intermediate member has been removed. However, the forces are then unbalanced and the remaining parts are subjected to proportionately increased stresses.

It will be evident from the foregoing that the mechanism according to the present invention is mathematically correct in transmitting power during changes in eccentricity. It follows that the apparatus may be run with any degree of initial eccentricity such that there is no danger of the parts striking when the spring and/or end play motions are superimposed on the initial eccentricity. This is a valuable characteristic of the mechanism according to the present invention and the parts are illustrated in Figs. 1, 2 and 3 in the positions determined by a considerable initial offset or eccentricity between the axes of the driving and driven members. This arrangement of the parts facilitates the mechanical design of the locomotive. Moreover, as the mechanism is theoretically correct for all positions within the extreme limits, the pinion or gear, or both can be changed so that the axes run at any one of a number of initial positions. Therefore a given locomotive equipped with transmission mechanism according to the present invention can be changed from a freight locomotive to a passenger locomotive merely by changing the pinion 30 and gear 32 and the connecting frame 24.

It will be understood also that, while I have described and illustrated herein a specific embodiment of the present invention, I do not limit myself to details of the present disclosure, the invention being defined and limited solely by the appended claims.

It will be understood that the foregoing discussion assumes that the planes of rotation of the driving, intermediate and driven members remain parallel. This condition is usually maintained in practice. While some departure from strict mathematical compensation occurs when this condition is not maintained, the rate of departure from the mathematical compensation by the present invention is not great with departures from the assumed condition met with in practice, and it has been found easy to proportion the parts to obtain a high factor of safety while transmitting a relatively high torque per axle. In particular, it will be understood that situations in which the greatest departures from the preferred positions of the parts are apt to occur are those, such as in turning sharp curves, in which the locomotive speed is low and the added stresses on the coupling mechanism due to angular variation are therefore near the minimum. Furthermore, it is a known expedient to use springs between the center and rim of the gear or the pinion of a locomotive or like coupling mechanism to permit a greater departure from the theoretically correct position of the parts than would otherwise be possible.

It will be remarked also that a practical advantage of the present invention is that the apparatus according thereto is so nearly mathematically correct under practical conditions that two couplings can be used on each axle. The power on each coupling and gear can thereby be halved and the width of the pinions and gears thereby be greatly reduced. The track clearances when using the mechanism according to the present invention may therefore be maintained ample even when the power per axle is very high.

A detail of the present invention is that often it is desired in practice to make the lengths of the links 42 and 44, while equal to each other, different from the lengths of links 52 and 54.

Having described my invention I claim:

1. The combination of a driving member, an intermediate member, a torque transmitting connection between said members permitting change in eccentricity without change in angular movement, means whereby said members are maintained in parallel planes, a driven member, and a pair of parallel links of equal length connecting said intermediate and driven members, the connections between said links and the driven and intermediate members being of the ball and socket or equivalent types.

2. The combination with a driving member of a driven member, an intermediate member connected to said members by pivoted links to transmit the torque therebetween, said intermediate member being free except for said links, and means carried by one of the other members for holding said intermediate member parallel thereto.

3. The combination with a driving member of a driven member, an intermediate member connected to said members by pivoted links to transmit the torque therebetween, said intermediate member being free except for said links and means carried by said driving member for holding said intermediate member parallel thereto.

4. In a transmission mechanism a hollow gear forming a driving member, a driven member having pins projecting through openings in said gear and a member floating within said gear supported by links pivotally connected with an interior wall of said gear and with said pins.

5. In a power transmission device, a driving element, an intermediate element and a driven element, the intermediate element being attached to the driving element by two parallel links equally spaced on opposite sides of the center of rotation, like ends of said links being attached to the driving element and their opposite ends to the intermediate element, the driving element end of each link being substantially diametrically opposite the intermediate element end of its companion link, the line between the points of contact of the links to the driving element being parallel and equally spaced on opposite sides of the center of rotation to a line connecting the points of contact of said links to the intermediate element, and the intermediate element being attached to the driven element by two parallel links equally spaced on opposite sides of the center of rotation, like ends of said links being attached to the driven element and their opposite ends to the intermediate element, the driven element end of each link being substantially diametrically opposite the intermediate element end of its companion link, the line between the points of contact of the links to the driven element being parallel and equally spaced on opposite sides of the center of rotation to a line connecting the points of contact of said links to the intermediate element, said parallel links between the intermediate element and the driving element being substantially at right angles to the parallel links between the intermediate element and the driven element.

6. In a power transmission device, a driving element, an intermediate element and a driven element, the intermediate element being attached to the driving element by two parallel links substantially equally spaced on opposite sides of the center of rotation, like ends of said links being attached to the driving element and their opposite ends to the intermediate element, the driving element end of each link being substantially diametrically opposite to the intermediate element end of its companion link, and the intermediate element being attached to the driven element by two parallel links substantially equally spaced on opposite sides of the center of rotation like ends of said links being attached to the driven element and their opposite ends to the intermediate element, the driven element end of each link being substantially diametrically opposite the intermediate element end of its companion link.

7. In a power transmission device, a driving element, an intermediate element and a driven element, the intermediate element being attached to the driving element by two parallel links substantially equally spaced on opposite sides of the center of rotation, the line between the points of contact of the links to the driving element being parallel and substantially equally spaced on opposite sides of the center of rotation to a line connecting the points of contact of said links to the intermediate element, and the intermediate element being attached to the driven element by two parallel links substantially equally spaced on opposite sides of the center of rotation, like ends of said links being attached to the driven element and their opposite ends to the intermediate element, the line between the points of contact of the links to the driven element being parallel and substantially equally spaced on opposite sides of the center of rotation to a line connecting the points of contact of said links to the intermediate element.

8. In a power transmission device, a driving element, an intermediate element and a driven element, the intermediate element being attached to the driving element by two parallel links substantially equally spaced on opposite sides of the center of rotation, like ends of said links being attached to the driving element and their opposite ends to the intermediate elements, the driving element end of each link being substantially diametrically opposite to the intermediate element end of its companion link, and the intermediate element being attached to the driven element by two parallel links substantially equally spaced on opposite sides of the center of rotation, like ends of said links being attached to the driven element and their opposite ends to the intermediate element, the driven element end of each link being substantially diametrically opposite the intermediate element end of its companion link, said links between the intermediate element and the driven element being attached to both thereof by ball and socket joints.

In testimony whereof I affix my signature.

ROBERT G. GRISWOLD.